United States Patent [19]

Kinsey et al.

[11] Patent Number: 5,401,970
[45] Date of Patent: Mar. 28, 1995

[54] BIOLOGICAL UV-B EFFECT MONITORING INSTRUMENT AND METHOD

[75] Inventors: James H. Kinsey, Baldwin, Md.; Richard J. Harms, Alexandria, Va.

[73] Assignee: Applied Research Corporation, Landover, Md.

[21] Appl. No.: 122,165

[22] Filed: Sep. 17, 1993

[51] Int. Cl.$^6$ .............................................. G01J 5/00
[52] U.S. Cl. .................................................. 250/372
[58] Field of Search ...................... 250/372 EM, 372

[56] References Cited

U.S. PATENT DOCUMENTS

| | | | |
|---|---|---|---|
| 2,114,163 | 4/1938 | Bird ..................................... | 250/368 |
| 3,896,313 | 7/1975 | Berman et al. ..................... | 250/372 |
| 4,749,865 | 6/1988 | Scheller .............................. | 250/338.1 |
| 5,008,548 | 4/1991 | Gat ..................................... | 250/372 |
| 5,036,311 | 7/1991 | Moran et al. ...................... | 340/600 |
| 5,107,123 | 4/1992 | Shi ..................................... | 250/372 |
| 5,151,600 | 9/1992 | Black ................................. | 250/372 |

FOREIGN PATENT DOCUMENTS

| | | | |
|---|---|---|---|
| 62-137527 | 6/1987 | Japan ................................. | 250/372 |
| 1-207640 | 8/1989 | Japan . | |
| 2-61524 | 3/1990 | Japan ................................. | 250/372 |
| 2-271222 | 11/1990 | Japan ................................. | 250/372 |

OTHER PUBLICATIONS

Frederick, John E., et al., "The Budget of Biologically Active Ultraviolet Radiation in the Earth-Atmosphere System", Journal of Geophysical Research, vol. 93, No. D4, pp. 3825-3832 (Apr. 20, 1988).

Berger, Daniel S., "Fluctuations and Trends in Environmental UV Loads", Human Exposure to Ultraviolet Radiation: Risks and Regulations, pp. 213-221 (1987).

Zurer, Pamela S., "Researchers Lack Data on Trends in UV Radiation at Earth's Surface", Science/Technology (Jul. 26, 1993).

DeLuisi, John J., et al., "A Determination of the Absolute Radiant Energy of a Robertson-Berger Meter Sunburn Unit", Atmospheric Environmental, vol. 17, No. 4, pp. 751-758 (1983).

Scotto, Joseph, et al., "Biologically Effective Ultraviolet Radiation: Surface Measurements in the United States, 1974 to 1985"; Science, vol. 239, pp. 762-764 (Feb. 12, 1988).

Primary Examiner—Constantine Hannaher

[57] ABSTRACT

A method for measuring and monitoring the biological effects of UV-B radiation along with an instrument for implementing this method. The biological UV-B effect monitor generally includes a first photodetector sensitive to UV-B only, a second photodetector sensitive to visible light only, and a microprocessor for normalizing the UV-B response relative to the visible response and applying one or more stored biologic response algorithms to the measured and normalized UV-B value to produce a biologic response output signal.

14 Claims, 4 Drawing Sheets

BIOLOGICAL UV-B EFFECT MONITORING INSTRUMENT AND METHOD

BACKGROUND OF THE INVENTION

1. Field of the Invention

The present invention pertains to radiation measurement instruments and, more particularly, to instruments and a method for monitoring the biological effects of radiation in the ultraviolet-B band.

2. Discussion of the Prior Art

Solar radiation consists of ultraviolet, visible and infrared light. Ultraviolet (UV) light has the shortest wavelengths, ranging from 200 to 400 nanometers (nm) and is further subdivided into UV-C with wavelengths from 200 to 290 nm, UV-B ranging from 290 to about 320 nm and UV-A in the 320 to 400 nm range. UV-B radiation has been the subject of recent scientific and medical interest because of its potential carcinogenic effects on humans and impact on ocean and plant life. In addition, publicized damage to the stratospheric ozone layer is thought to be dangerously increasing the amount of UV-B radiation incident on the earth's surface.

Within the past decade, the NASA satellite instrument TOMS (Total Ozone Mapping Spectrometer) has been recording large decreases in the stratospheric ozone over Antarctica and to a lesser extent over the northern polar regions. Simultaneous ground based measurements of UV-B in Antarctica consistently show a corresponding inverse correlation as a function of stratospheric ozone concentrations. It is becoming increasingly important to accurately measure and monitor UV-B and the accompanying biological effects, and recently a number of workshops have been conducted to address the problems associated with obtaining such information.

One accepted measure relating incident UV-B energy to a particular biological effect, i.e., sunburn, is the McKinlay-Diffey (M-D) erythema action spectrum. The M-D spectrum defines the onset of sunburn as a function of the radiant intensity, or surface irradiance, and the wavelength of the incident radiation. By multiplying the surface irradiance in each increment of the 290–320 nm UV-B spectrum by the corresponding M-D irradiance and summing the values to approximate a weighted integral, a single value estimator of the sunburning potential of an environment can be derived. The values of the M-D relationship are known and fixed but the incident UV-B radiation at any point and time must be measured. The Robertson-Berger meter (RB meter) was designed in the early 1970's as a low cost means of generally correlating incident UV-B radiation with the erythema relationship. The RB meter uses four levels of filtration or wavelength conversion to obtain a signal that is roughly proportional to the UV-B radiation weighted by the response function of the instrument. Although not exact, there is a similarity between the RB meter response and the accepted erythema (sunburn) response of average Caucasian skin. Solar radiation enters the instrument from the hemisphere with a quasi-Lambertian response (i.e., a response that varies as the cosine of the angle of incidence with respect to a plane perpendicular to the plane of the input aperture) where it is integrated by a diffuser. This diffused radiation then passes through a Schott UG11 glass filter transmitting in two bands: 250 to 400 nm and 700 to 850 nm, respectively (the long wavelength transmission is small compared to the UV). This radiation then passes to a $MgWO_4$ phosphor screen excited only by the UV and produces an output in a wavelength band from 350 to 650 nm. The light then passes through a Corning 4010 glass filter transmitting only between 500 and 600 nm. Finally, the radiation falls on the cathode of a 1P39 vacuum phototube sensitive to 300 to 650 nm. The result is a solar blind detector system that responds to UV-B.

A network of RB meters was set up to monitor sunburning radiation around the globe but a review of the RB meter output at eight field sites in the continental U.S. showed a surprising trend of decreasing UV-B over the twelve years considered (1974–1985) despite increasing evidence of ozone layer weakening. This decrease is assumed to reflect an increase in cloudiness and an increase in tropospheric ozone concentrations in the urban sites selected for inclusion in the RB network, thereby masking the effects of the decrease in ozone attributed to chlorinated fluorocarbons (CFC).

The difficulty is that cloud cover, one of the two major atmospheric influences on incident UV-B, affects the spectrum of solar radiation uniformly from UV through visible and into the infra-red (IR) band; but the second major influence, the ozone level, attenuates the shorter wavelengths in the UV-B spectrum much more than those higher in the range.

The RB meter, developed before the recent interest in the depletion of the ozone layer, responds to total irradiance across the UV-B wavelength spectrum and operates on the assumption that the energy in each wavelength increment follows a characteristic predictable distribution. This was a reasonable approach so long as the ozone filter of UV-B radiation remained essentially constant, but is insufficient when the varying effects of ozone action is the focus of inquiry.

Measuring solar UV with a single detector, even a solar-blind device, does not satisfy the need for accurate determination of the biological effects of incident radiation in the face of changing ozone filter. Both the quality and quantity of biological effects are incorrectly inferred from the output of a single detector. The single value for total UV-B irradiance produced by such a detector can correspond to an infinite number of different energy-frequency distributions, each potentially having different biological implications based on the independent and uncorrelated influences of cloud cover and ozone absorption. In addition, the phosphor convertor screen, the UV filter, the visible filter and the photocathode of the phototube of the existing RB meter design all have potential for deterioration and drifting, thereby degrading the instrument response.

The alternative approach to accurately assessing surface UV-B irradiance as a function of wavelength has required bulky, expensive spectrographic equipment and expert operators.

SUMMARY OF THE INVENTION

Accordingly, it is a primary object of the present invention to overcome the above-mentioned disadvantages of the prior art by providing an instrument that accurately measures the biological impact of UV-B radiation by mathematically combining simultaneous measures of UV-B radiance and total radiation flux as measured in an adjacent visible light band to distinguish cloud cover attenuation from ozone attenuation of solar radiation.

Another object of the present invention is to provide an instrument that accounts for both the quantity and quality of the radiant energy distribution as a function of wavelength across the UV-spectrum by normalizing measured UV-B irradiance according to independently measured visible spectrum irradiance.

Yet another object of the present invention is to combine the M-D erythema relationship with measures of incident UV-B radiation to accurately and instantly assess the biological effects of ambient sunshine on human skin.

Some of the advantages of the present invention over the prior art are that the UV-B radiation measuring instrument of the present invention is accurate, stable, easy to operate and inexpensive to manufacture.

The present invention is generally characterized in a biological UV-B effect monitor having a phototube with a CsTe photocathode responsive only to UV-B radiation and a separate photodiode sensitive to only the light in the visible range, each mounted behind diffuser elements and each having output signals amplified, converted from analog to digital, and fed into a microprocessor. The microprocessor serves as a program controller sampling the two signal streams and processing the paired values into quotients, dividing the UV-B by the visible flux values and solving a polynomial regression equation using prestored coefficient values and a calibration constant to define the biological response according to the McKinlay-Diffey relationship as a function of the incident UV-B level.

The present invention is further characterized in a biological UV-B effect monitor having a programmable controller for measuring the incident level of UV-B radiation in terms of any defined biological response curve or relationship.

Other objects and advantages of the present invention will become apparent from the following description of the preferred embodiment taken in conjunction with the accompanying drawings.

DESCRIPTION OF THE PREFERRED EMBODIMENT

Figure 1:
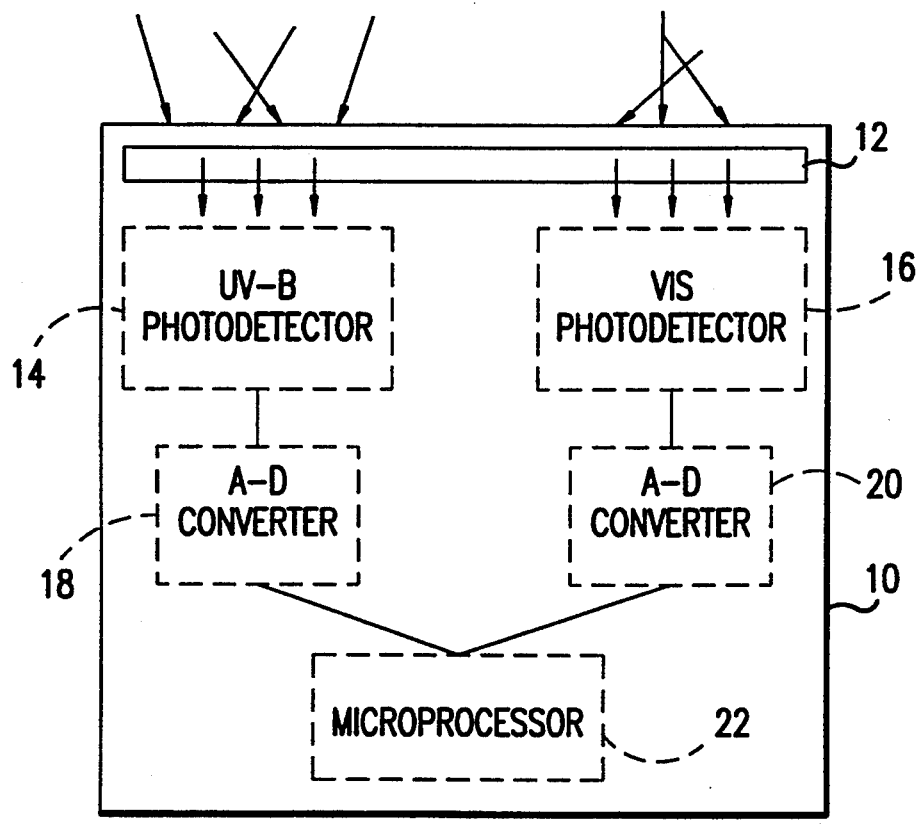
FIG. 1 is a block diagram of a biological UV-B effect monitor of the present invention.

Referring to FIG. 1, a biological UV-B effect monitor 10 according to the present invention includes a diffuser or integrating sphere 12, a UV-B spectrum photodetector amplifier circuit 14 and a visible spectrum photodetector amplifier circuit 16 feeding into analog to digital converters 18 and 20, respectively, and a controller or microprocessor circuit 22.

The diffuser 12 of, for instance, ground silica, provides an integrated Lambertian sum of the diffuse, or scattered, irradiance and the direct irradiance in order to be comparable to the radiation absorbed by biological entities.

Figure 2:
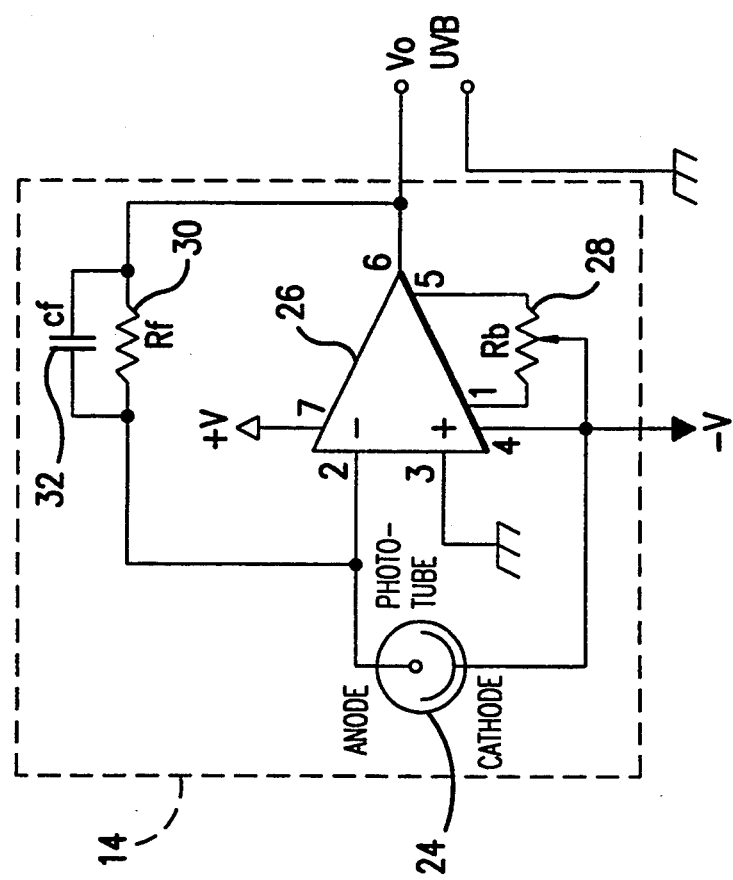
FIG. 2 is a schematic diagram of the UV-B spectrum photodectector amplifier circuit of the present invention.

The UV-B spectrum photodetector amplifier circuit 14, shown in detail in FIG. 2, includes a CsTe (Cesium-Telluride) photocathode phototube 24 for instance the Model R1826 sold by Hamamatsu Photonics of Hamamatsu City, Japan, insensitive to wavelengths longer than about 320 nm and therefore requiring no additional filtration. The UV-B phototube output signal is amplified as is the visible photodiode output by an operational amplifier 26, such as the National Semiconductor LF441 JFET sold by National Semiconductor Corporation of Santa Clara, Calif. A balance variable resistor 28 of, for example, 25K $\Omega$, to adjust the DC-offset of the amplified signal, and a parallel combination of a gain adjusting feedback resistor 30 of, for example, 10 to 30M$\Omega$, and a noise reduction capacitor 32 of, for example, 100 picofarads, are also included in the circuit.

Figure 3:
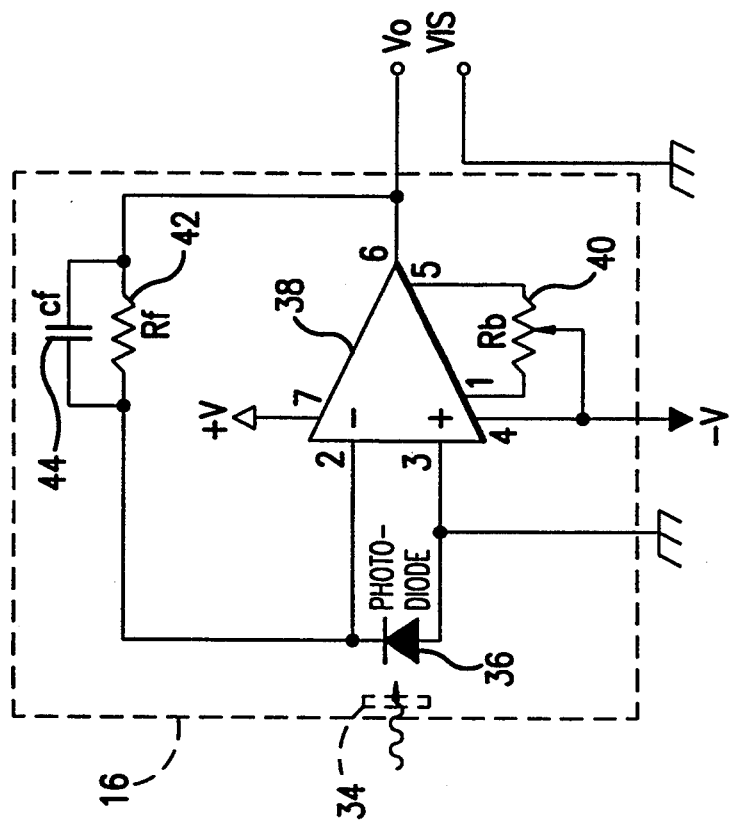
FIG. 3 is a schematic diagram of the visible spectrum photodetector amplifier circuit of the present invention.

The visible spectrum photodetector amplifier circuit 16 shown in FIG. 3 includes a short wavelength blocking filter 34, for example a layer of Schott GG-420 glass, to eliminate UV-B response. A semiconductor photodiode 36 is responsive to solar radiation in the visible range, preferably in a band at the lower end of the visible spectrum, such as the Model G1962 GaP (Gallium Phosphide) photodiode marketed by Hamamatsu with a Schott GG-420 shortwave blocking filter. The photodiode output signal, responsive to non-UV-B irradiance, is amplified by a high impedance FET-input operational amplifier 38, such as the LF441, including a balance variable resistor 40 and a parallel combination of a feedback resistor 42 and a noise reduction capacitor 44 of similar values to those in the UV-B phototube output circuit.

The output signals produced by the UV-B and visible spectrum photodetector amplifier circuits 14 and 16, respectively, are weighted integrals of the response functions of the instruments to the incident solar irradiance spectrum. In the same fashion the "output signal", in the form of reddening of the skin, produced by the human body in response to solar irradiance, is the weighted integral of the body's response function, characterized by the McKinlay-Diffey spectrum, and the incident solar irradiance.

Figure 4:
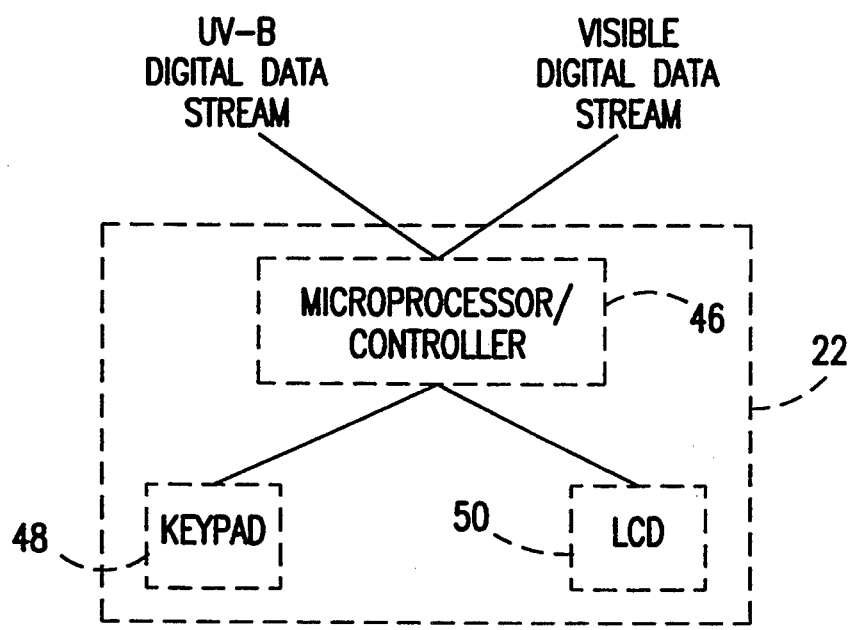
FIG. 4 is a block diagram of the microprocessor circuit of the present invention.
Figure 5:
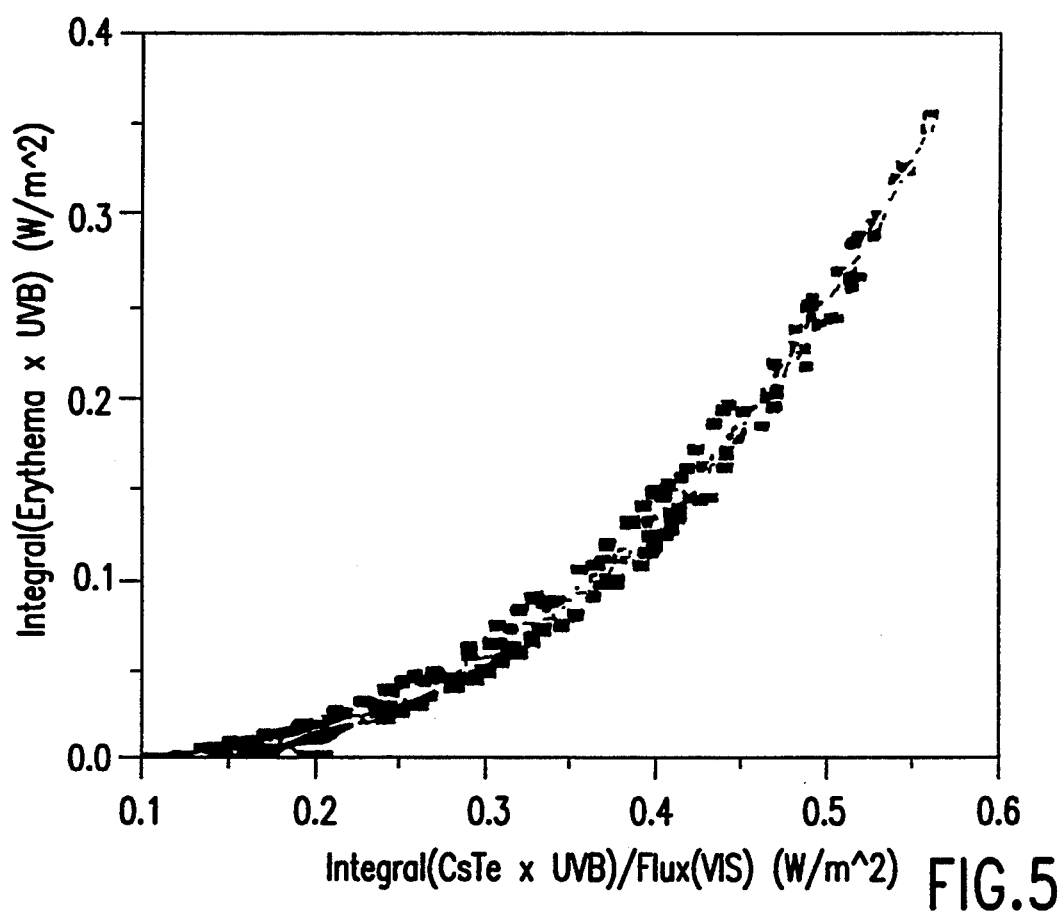
FIG. 5 is a plot of the weighted integral of Erythema-UV-B as a function of the weighted integral of the CsTe photodiode response to UV-B divided by a visible radiance data set.

The output signals of the UV-B and visible spectrum photodetector amplifier circuits 14 and 16, respectively, are converted from analog to digital form by converters 18 and 20 respectively, fed into the microprocessor circuit 22 (FIG. 4) as digital data streams, and mathematically processed by a commercial microprocessor-based controller 46. Control and display of the microprocessor operations are attained through keypad 48 and LCD 50, respectively. The microprocessor samples simultaneous values from the two input digital data streams and computes the quotient $U(t)/V(t)$, where $U(t)$ is the weighted integral output value from the UV-B circuit at any time t, and $V(t)$ is the weighted integral output value from the visible light circuit. The microprocessor then solves a quadratic equation relating biological response to the computed quotient. A particular biological response as a function of $U(t)/V(t)$ used in the preferred embodiment of the invention is the erythema response characterized by the McKinlay-Diffey spectrum, and might take the form:

$$E_s = C_1 + C_2 E_D + C_3 E^2_D$$

where $E_B$ is the erythema biological response, $E_D$ is the quotient $U(t)/V(t)$ and $C_1$, $C_2$ and $C_3$ are coefficients. For example, values of 0.0036, 0.49 and 1.59 can be substituted for $C_1$, $C_2$ and $C_3$, respectively in the equation to represent a least squares curve fit of the plot or function, shown in FIG. 5, of the weighted integral of erythema response and UV-B radiance against the weighted integral of a calibrated CsTe phototube response to UV-B divided by visible radiance. The points plotted in FIG. 5 are based on a comprehensive set of modeled solar irradiances covering a wide range of solar zenith angles, latitudes and ozone concentrations produced by a model program described in a paper published by J. E. Frederick and D. E. Lubin entitled "The Budget of Biologically Active Ultraviolet Radiation in the Earth-Atmosphere System" in the Journal of Geophysical Research, 93, 3825–3832, (1988). The same technique can be applied to any representative set of real or modeled UV irradiances and can be weighted against any known UV-B biological response, for instance the DNA damage action spectrum, or the plant growth action spectrum.

Figure 6:
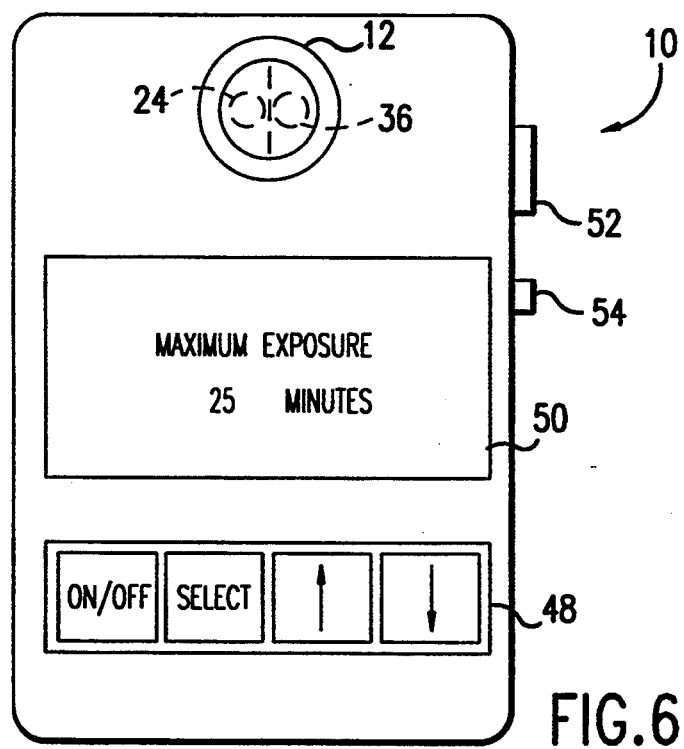
FIG. 6 is a front view of a biological UV-B effect monitor of the present invention.

Stored within the microprocessor are the calibrated coefficient values derived for each UV-B biological response of interest and one or more calibration constants. Local control and display means are preferably provided by, for example, a keypad 48 and LCD display 50, respectively, as shown in FIG. 6. A digital serial port 52 is provided to allow direct connection between the biological UV-B effect monitor and a computer, plotter, electronic storage unit or other such device. A second port 54 is provided for connection to an external electrical power source; alternatively the monitor can be energized by a battery. A diffuser 12 is shown on the face of the monitor with the filtered UV-B sensitive CsTe phototube 24 and the visible light sensitive GaP photodiode 36 shown in phantom therebehind. The monitor is designed for use in a horizontal position with the diffuser and photodetectors directed toward the zenith. Visible and/or audible signals can be programmed into the controller/microprocessor to alert users of various levels of biological response measured by the instrument.

Figure 7:
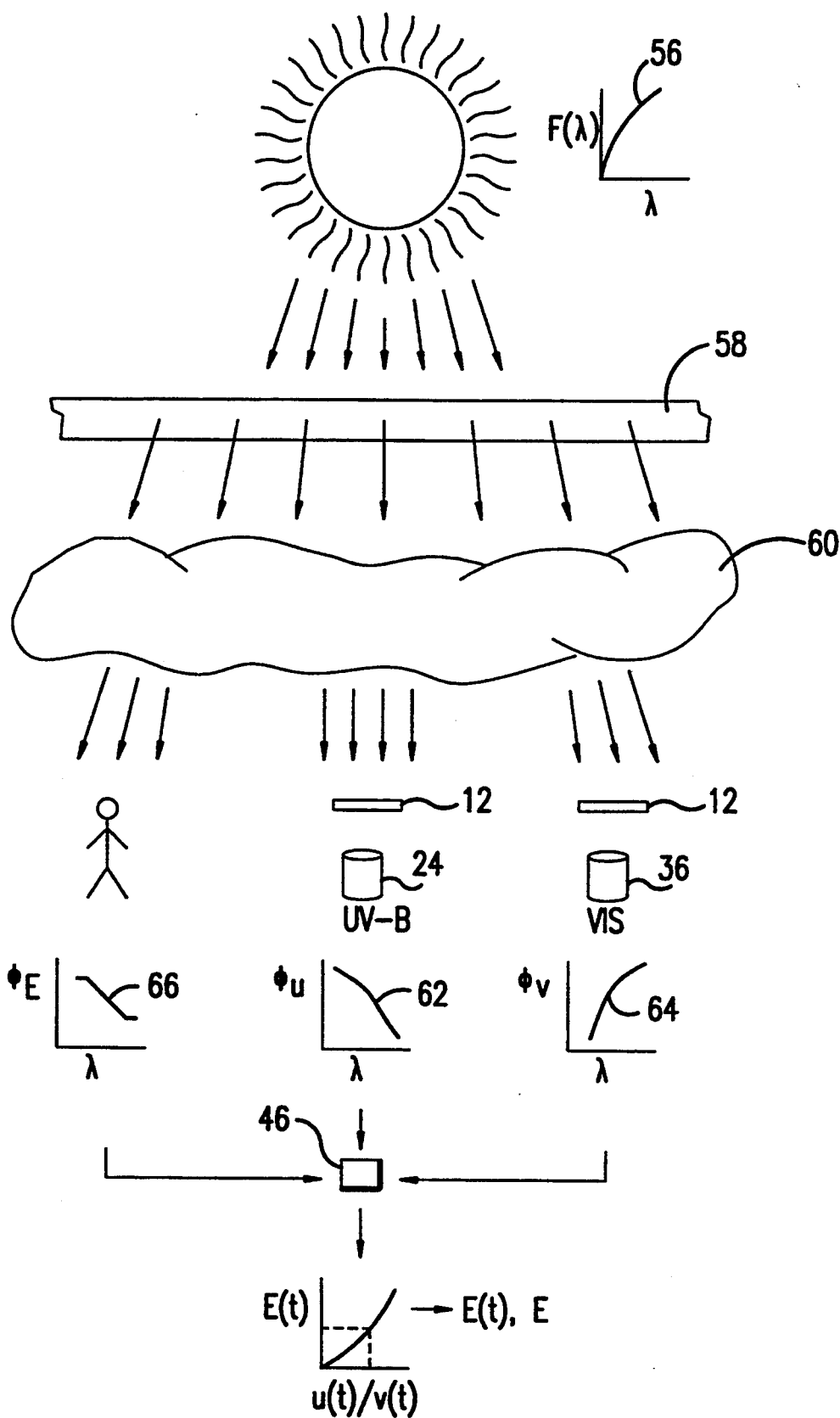
FIG. 7 is a diagram illustrating the operation of the biological UV-B effect monitor of this invention on the acquired data.

In use, solar radiation, represented by a spectrum 56 of energy as a function of wavelength, as shown in FIG. 7, passes through, among other less influential attenuators, atmospheric ozone 58 and cloud cover 60 before passing through a diffuser 12 and reaching the UV-B and visible photodetectors 24 and 36, respectively, of the biological UV-B response monitor and exposed human skin. Cloud cover 60 affects solar radiation evenly across the range of wavelengths, reducing the amplitude but not the shape of the solar spectrum. Atmospheric ozone 58, on the other hand, affects the UV-B wavelengths in an uneven, frequency-dependent manner but has negligible effect in the visible range. The interaction of the filtered incident solar radiation with the photodetectors produces response functions illustrated by the graphs 62 and 64 for the UV-B and visible instruments, respectively, and the McKinlay-Diffey erythema response plot 66 for human skin. These weighted integral responses are mathematically combined by the microprocessor-controller 46 to produce a quotient of the UV-B signal to the visible range signal, a normalized UV-B signal related directly to biological response. The corresponding erythema value is output by the monitor for any given time, E(t), or can be recorded as a time history of the effect, E, to provide cumulative values of erythema. Other UV-B biological responses can be measured and monitored by programming appropriate mathematical functions into the microprocessor.

Inasmuch as the present invention is subject to many variations, modifications and changes in detail, it is intended that the subject matter discussed above and shown in the accompanying drawings be interpreted as illustrative and not in a limiting sense.

What is claimed is:

1. A biological UV-B effect monitor for assessing biological effects of solar UV-B radiation comprising:
   a first photodetector amplifier circuit responsive to solar radiation in the UV-B band for producing an output signal proportional to the weighted integral of the incident UV-B solar spectrum with said first photodetector response thus producing a UV-B output signal U(t) at each instant t;
   a second photodetector amplifier circuit responsive to solar radiation in the visible band for producing a second output signal proportional to the weighted integral of a portion of the incident visible solar spectrum with said second photodetector response thus producing a visible output signal V(t) at each instant t;
   a diffuser for integrating both diffuse and direct radiation entering said first and second photodetectors;
   a short wavelength blocking filter to prevent UV-B radiation from entering said second, visible spectrum, photodetector circuit;
   a microprocessor circuit for sampling values from said UV-B and visible output signals, U(t) and V(t), respectively, and creating a quotient by dividing said UV-B output signal by said visible output signal;
   at least one algorithm stored in said microprocessor for determining a biological effect as a function of said quotient;
   a program executable by said microprocessor for applying said algorithm to said measured quotient to determine the magnitude of said biological effect; and
   display means for reporting said biological effect.

2. The biological UV-B effect monitor as recited in claim 1 further comprising at least one analog to digital converter for converting said UV-B and visible output signals from analog form to digital stream form.

3. The biological UV-B effect monitor as recited in claim 1 wherein said first UV-B photodetector amplifier circuit includes a CsTe phototube.

4. The biological UV-B effect monitor as recited in claim 1 wherein said second photodetector amplifier circuit includes a semiconductor GaP photodiode.

5. The biological UV-B effect monitor as recited in claim 1 wherein said diffuser produces a Lambertian response.

6. The biological UV-B effect monitor as recited in claim 1 wherein said diffuser is ground silica.

7. The biological UV-B effect monitor as recited in claim 1 wherein said display means is an LCD panel.

8. The biological UV-B effect monitor as recited in claim 1 wherein said biological effect is the McKinlay-Diffey erythema response.

9. The biological UV-B effect monitor as recited in claim 1 wherein said algorithm is based on the weighted integral of the McKinlay-Diffey erythema response to a set of solar irradiance values.

10. The biological UV-B effect monitor as recited in claim 1 wherein said algorithm represents the least squares fit of the weighted integral of the McKinlay-Diffey erythema response and UV-B radiance against the weighted integral of said second photodetector amplifier circuit to UV-B radiation divided by visible radiance.

11. The biological UV-B effect monitor as recited in claim 10 wherein said algorithm has the form $E_B = C_1 + C_2 E_D + C_3 E^2_D$ where $E_B$ is said erythema response, $E_D$ is said quotient, and $C_1$, $C_2$ and $C_3$ are coefficients.

12. A method for assessing effects of solar UV-B radiation comprising the steps of:
 (a) measuring the incident UV-B irradiance using a first photodetector circuit responsive only to UV-B irradiance;
 (b) measuring the incident visible irradiance using a second photodetector circuit unresponsive to UV-B irradiance;
 (c) mathematically normalizing the response of said first UV-B photodetector circuit by the response of said second visible photodetector circuit to produce a measure of UV-B irradiance corrected for wavelength independent factors such as clouds and smoke; and
 (d) correlating the UV-B effects as characterized by known UV-B response spectra with said normalized UV-B response.

13. The method for assessing effects of solar UV-B radiation as recited in claim 12 further comprising the step of integrating the incident radiation to produce Lambertian responses to said first and second photodetector circuits.

14. The method for assessing effects of solar UV-B radiation as recited in claim 12 wherein step (a) is performed by a CsTe phototube in said first photodetector circuit.

* * * * *